US012110207B2

(12) United States Patent
Wei

(10) Patent No.: US 12,110,207 B2
(45) Date of Patent: Oct. 8, 2024

(54) ELECTROMAGNETIC BRAKE CONFIGURED TO SLOW DECELERATION RATE OF PASSENGER CONVEYER DURING BRAKING

(71) Applicant: OTIS ELEVATOR COMPANY, Farmington, CT (US)

(72) Inventor: Wei Wei, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1364 days.

(21) Appl. No.: 16/683,328

(22) Filed: Nov. 14, 2019

(65) Prior Publication Data

US 2021/0147177 A1 May 20, 2021

(51) Int. Cl.

| | |
|---|---|
| ***B66B 1/36*** | (2006.01) |
| ***B61H 7/08*** | (2006.01) |
| ***B66B 1/32*** | (2006.01) |
| ***B66B 1/44*** | (2006.01) |
| ***B66B 5/02*** | (2006.01) |
| ***B66B 9/00*** | (2006.01) |
| ***B66B 11/04*** | (2006.01) |
| ***B66D 5/14*** | (2006.01) |

(52) U.S. Cl.

CPC .................. *B66B 1/36* (2013.01); *B66B 1/32* (2013.01); *B66B 1/44* (2013.01); *B66B 5/02* (2013.01); *B66B 9/00* (2013.01); *B66B 11/043* (2013.01); *B66D 5/14* (2013.01); *B61H 7/08* (2013.01)

(58) Field of Classification Search

CPC .... B66B 1/36; B66B 1/32; B66B 1/44; B66B 5/02; B66B 9/00; B66B 11/043; B66B 5/14; B66D 5/14; B66D 5/30; B61H 7/08

See application file for complete search history.

(56) References Cited

U.S. PATENT DOCUMENTS

2013/0233657 A1* 9/2013 Kattainen ................. B66B 1/32 188/156
2016/0167921 A1* 6/2016 Kattainen ................. B66B 1/24 187/289
2016/0376123 A1* 12/2016 Lotfi ....................... F16D 55/22 187/250
2017/0233219 A1* 8/2017 Studer ..................... B66B 1/365 187/247
2017/0362051 A1* 12/2017 Millet ................. B66B 11/0476

* cited by examiner

*Primary Examiner* — Jeffrey Donels

(74) *Attorney, Agent, or Firm* — Carlson, Gaskey & Olds, P.C.

(57) ABSTRACT

This disclosure relates to an electromagnetic brake configured to slow a deceleration rate of a passenger conveyer, such as an elevator car, during braking. In particular, this disclosure relates to a passenger conveyer system including the electromagnetic brake and a corresponding method. An example system includes a controller and an electromagnetic brake. The electromagnetic brake includes a disc configured to interface with a drive shaft, a spring, and a plate biased in a first direction into engagement with the disc by a bias force of the spring. The electromagnetic brake further includes an electromagnet selectively activated in response to a command from the controller to produce a magnetic field attracting the plate in a second direction opposite the first direction to partially offset the bias force of the spring. Further, when the electromagnet is activated, the plate engages the disc.

20 Claims, 2 Drawing Sheets

ELECTROMAGNETIC BRAKE CONFIGURED TO SLOW DECELERATION RATE OF PASSENGER CONVEYER DURING BRAKING

TECHNICAL FIELD

This disclosure relates to an electromagnetic brake configured to slow a deceleration rate of a passenger conveyer, such as an elevator car, during braking. In particular, this disclosure relates to a passenger conveyer system including the electromagnetic brake and a corresponding method.

BACKGROUND

Passenger conveyer systems such as elevator systems generally include a motor, drive shaft, and brake system. In the context of an elevator system, the motor, drive shaft, and brake system control movement of an elevator car within a hoistway. One known type of brake system includes an electromagnetically released brake configured to permit rotation of the drive shaft when an electromagnet is activated and to prevent rotation of the drive shaft, and in turn vertical motion of the elevator car, when the electromagnet is deactivated.

SUMMARY

A passenger conveyer system according to an exemplary aspect of the present disclosure includes, among other things, a controller and an electromagnetic brake. The electromagnetic brake includes a disc configured to interface with a drive shaft, a spring, and a plate biased in a first direction into engagement with the disc by a bias force of the spring. The electromagnetic brake further includes an electromagnet selectively activated in response to a command from the controller to produce a magnetic field attracting the plate in a second direction opposite the first direction to partially offset the bias force of the spring. Further, when the electromagnet is activated, the plate engages the disc.

In a further non-limiting embodiment of the foregoing passenger conveyer system, the electromagnet is a secondary electromagnet, and the electromagnetic brake further comprises a primary electromagnet selectively activated in response to a command from the controller to produce a magnetic field attracting the plate in the second direction and sufficient to overcome the bias force of the spring. When the primary electromagnet is activated, the plate moves in the second direction and out of engagement with the disc.

In a further non-limiting embodiment of any of the foregoing passenger conveyer systems, the primary and secondary electromagnets include a respective primary coil and a secondary coil.

In a further non-limiting embodiment of any of the foregoing passenger conveyer systems, the primary and secondary coils are arranged circumferentially about a central axis of the electromagnetic brake, and the primary coil radially surrounds the secondary coil.

In a further non-limiting embodiment of any of the foregoing passenger conveyer systems, the primary electromagnet includes a primary power supply electronically connected to the primary coil, and the secondary electromagnet includes a secondary power supply electronically connected to the secondary coil.

In a further non-limiting embodiment of any of the foregoing passenger conveyer systems, a level of current flowing through the secondary coil is adjustable.

In a further non-limiting embodiment of any of the foregoing passenger conveyer systems, the controller issues a command to the secondary power supply to adjust the level of current flowing through the secondary coil based on a weight within an elevator car.

In a further non-limiting embodiment of any of the foregoing passenger conveyer systems, the controller issues a command to the secondary power supply to adjust the level of current flowing through the secondary coil based on a deceleration rate of an elevator car.

In a further non-limiting embodiment of any of the foregoing passenger conveyer systems, the level of current flowing through the secondary coil produces a magnetic field that offsets between 20-30% of the bias force of the spring on the plate.

In a further non-limiting embodiment of any of the foregoing passenger conveyer systems, activation of the electromagnet alone does not result in movement of the plate in the second direction.

In a further non-limiting embodiment of any of the foregoing passenger conveyer systems, the system includes an electric motor, a drive shaft mechanically connected to the electric motor, and an elevator car suspended from at least one suspension member wrapped around the drive shaft.

In a further non-limiting embodiment of any of the foregoing passenger conveyer systems, the electromagnet is activated when slippage of the at least one suspension member is detected.

In a further non-limiting embodiment of any of the foregoing passenger conveyer systems, the plate includes a brake pad configured to directly contact the disc.

In a further non-limiting embodiment of any of the foregoing passenger conveyer systems, the passenger conveyer system is an elevator system.

A method according to an exemplary aspect of the present disclosure includes, among other things, slowing a deceleration rate of an elevator car when an electromagnetic brake is engaged by activating an electromagnet to partially offset a bias force of a spring.

In a further non-limiting embodiment of the foregoing method, the spring is configured to urge a plate into engagement with a disc, the disc is interfaced with a drive shaft, and the elevator car is suspended from at least one suspension member wrapped around the drive shaft.

In a further non-limiting embodiment of any of the foregoing methods, the slowing step occurs in response to slippage of the at least one suspension member.

In a further non-limiting embodiment of any of the foregoing methods, the slowing step includes adjusting a level of current flowing through a coil of the electromagnet.

In a further non-limiting embodiment of any of the foregoing methods, the slowing step includes adjusting the level of current flowing through the coil based on the deceleration rate of the elevator car.

In a further non-limiting embodiment of any of the foregoing methods, the slowing step includes adjusting the level of current flowing through the coil based on a weight of a load within the elevator car.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to an electromagnetic brake configured to slow a deceleration rate of a passenger conveyer, such as an elevator car, during braking. In particular, this disclosure relates to a passenger conveyer system including the electromagnetic brake and a corresponding method. An example system includes a controller and an electromagnetic brake. The electromagnetic brake includes a disc configured to interface with a drive shaft, a spring, and a plate biased in a first direction into engagement with the disc by a bias force of the spring. The electromagnetic brake further includes an electromagnet selectively activated in response to a command from the controller to produce a magnetic field attracting the plate in a second direction opposite the first direction to partially offset the bias force of the spring. Further, when the electromagnet is activated, the plate engages the disc. Among other benefits, which will be appreciated from the below description, this disclosure provides effective braking without reducing ride quality by subjecting passengers to relatively high deceleration rates.

Figure 1:
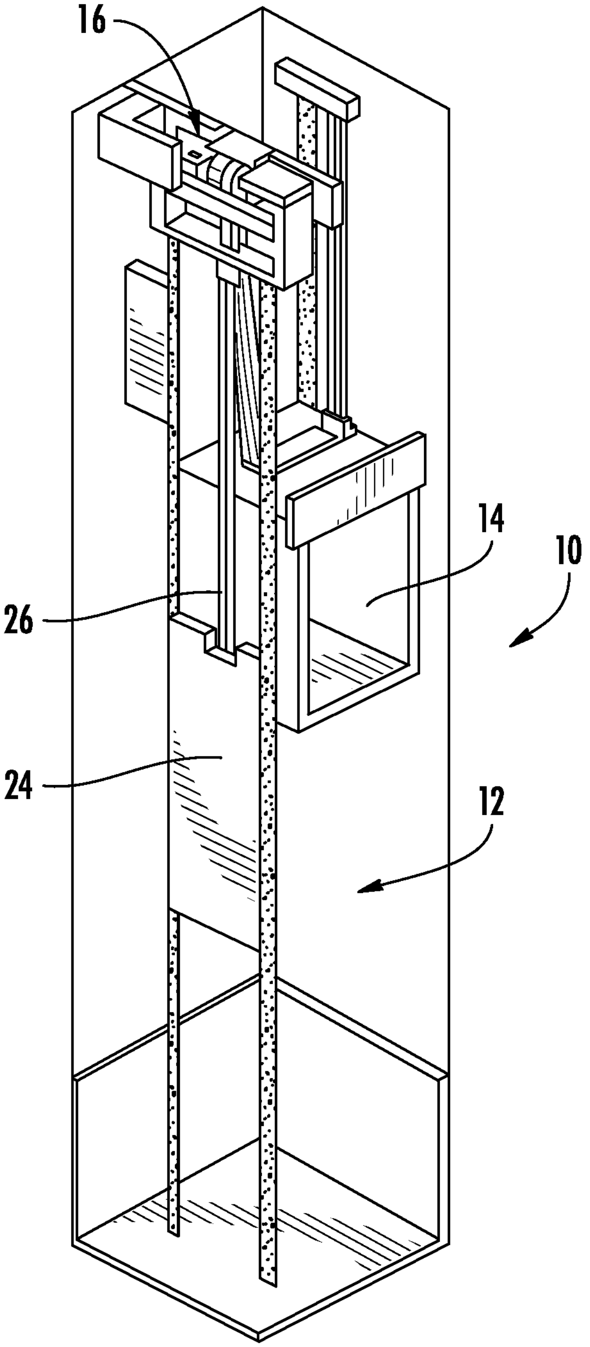
FIG. 1 illustrates an example passenger conveyer system.

FIG. 1 illustrates an example passenger conveyer system 10. In FIG. 1, the passenger conveyer system 10 is an elevator system, however this disclosure extends to other passenger conveyer systems such as escalators.

Figure 2:
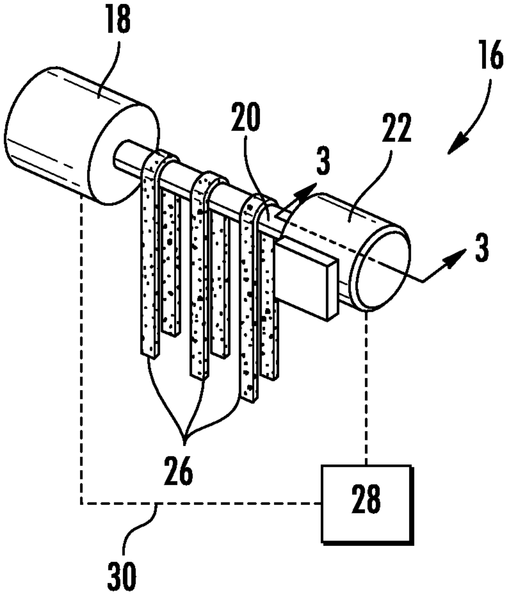
FIG. 2 illustrates an example drive system.

The passenger conveyer system 10 includes a hoistway 12 within which a passenger conveyer, which here is an elevator car 14, travels. Travel of the elevator car 14 is governed, in this example, by a drive system 16 including an electric motor 18 (FIG. 2), a drive shaft 20 mechanically connected to the electric motor 18, and an electromagnetically released brake 22 mechanically connected to the electric motor 18 via the drive shaft 20. The electromagnetically released brake 22 will be referred to herein as an electromagnetic brake. In this example, the drive system 16 is mounted near the top of the hoistway 12. It should be understood, however, that the drive system 16 need not be mounted within the hoistway 12 and could be arranged outside the hoistway 12 in a machine room, for example.

The elevator car 14 and a counterweight 24 are suspended from one or more suspension members 26, such as belts or ropes, wrapped around the drive shaft 20. Thus, when the drive shaft 20 rotates, the elevator car 14 moves vertically up or down within the hoistway 12 depending upon the direction of rotation of the drive shaft 20.

A controller 28 monitors and controls drive system 16. The controller 28 is shown schematically in FIG. 2. The controller 28 includes electronics, software, or both, to perform the necessary control functions for operating the drive system 16. In one non-limiting embodiment, the controller 28 is an elevator drive controller. Although it is shown as a single device, the controller 28 may include multiple controllers in the form of multiple hardware devices, or multiple software controllers within one or more hardware devices. A controller area network (CAN) 30, illustrated schematically, allows the controller 28 to communicate with various components of the passenger conveyer system 10 by wired and/or wireless electronic connections.

Figure 3:
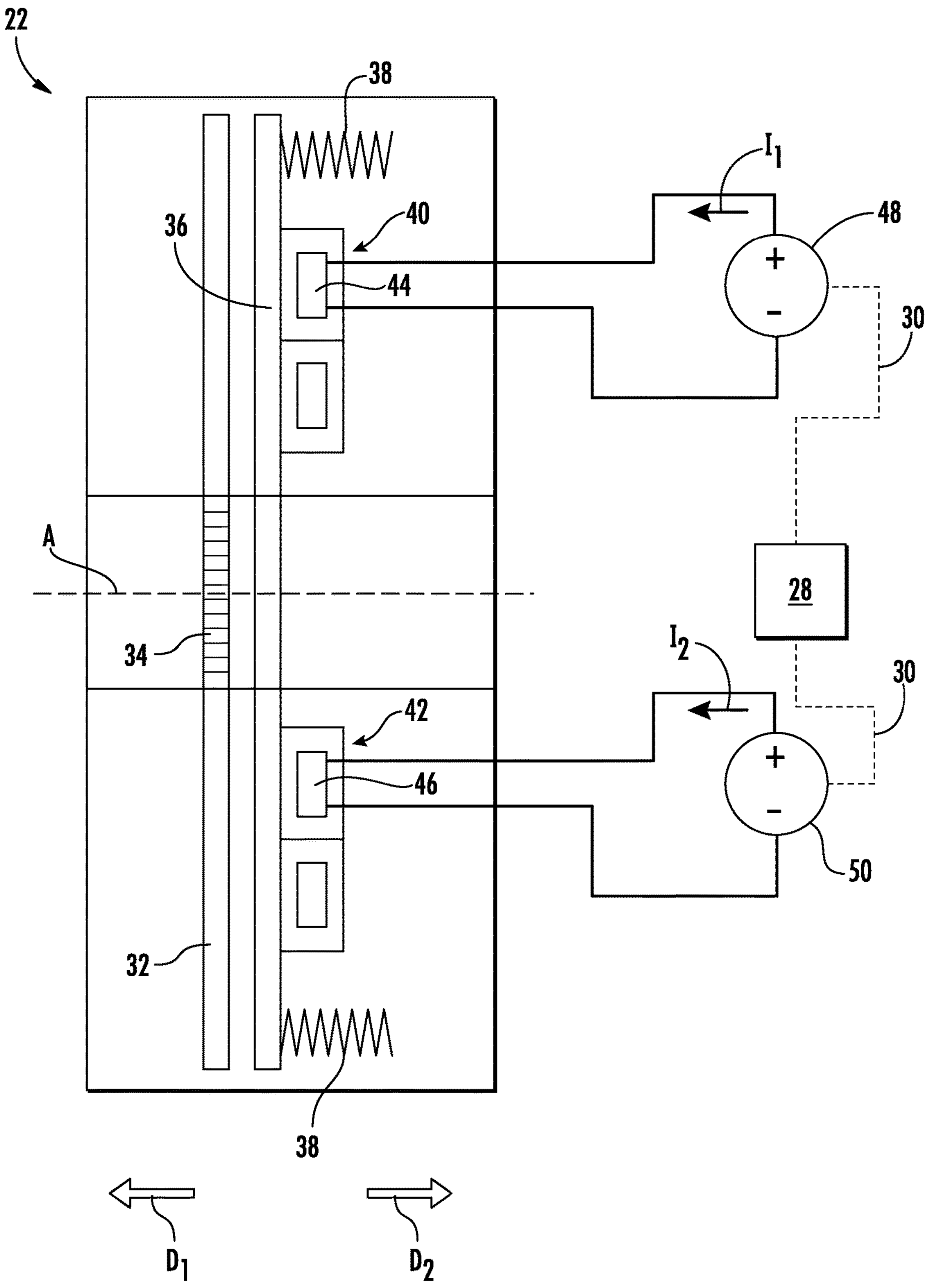
FIG. 3 is a schematic, cross-sectional view of an example electromagnetic brake taken along line 3-3 from FIG. 2.

FIG. 3 is a cross-sectional view showing additional detail of an example electromagnetic brake 22. In this example, the electromagnetic brake 22 is a clutch brake, but this disclosure is not limited to clutch brakes and extends to other types of electromagnetic brakes such as caliper brakes, drum brakes, etc.

In the example of FIG. 3, the electromagnetic brake 22 is oriented about a central axis A and includes a disc 32 including a splines 34 configured to interface with the drive shaft 20 (not shown in FIG. 3). The disc 32, and in turn the drive shaft 20, is configured to selectively rotate about the central axis A depending on a position of a plate 36. The plate 36 may include a brake pad configured to directly contact the disc 32 depending on the position of the plate 36. In this example, the plate 36 is linearly moveable along the central axis A and is biased in a first direction $D_1$ by one or more biasing members, which here are springs 38, into engagement, specifically direct contact, with the disc 32. The first direction $D_1$ is parallel to the central axis A and extends in the left-hand direction relative to FIG. 3. While there are two springs 38 in contact with the plate 36 in FIG. 3, it should be understood that there could be one or more springs 38. Further, while only one set of discs, plates, and springs is shown in FIG. 3, it should be understood that the electromagnetic brake 22 could include one or more additional sets of discs, plates, and springs.

When the plate 36 directly contacts the disc 32 under the force of the springs 38, the plate 36 prevents the disc 32 from rotating about the central axis A. In this condition, the electromagnetic brake 22 is engaged and rotation of the drive shaft 20 slows until it is prevented from rotating (i.e., stopped). In turn, the elevator car 14 decelerates until it is ultimately prevented from moving (i.e., stopped) within the hoistway 12.

In order to disengage the electromagnetic brake 22 and permit rotation of the drive shaft 20, the controller 28 issues one or more commands to activate a primary electromagnet 40 of the electromagnetic brake 22. The electromagnetic brake 22 also includes a secondary electromagnet 42 configured to slow (i.e., reduce) a deceleration rate of the elevator car 14. The primary and secondary electromagnets 40, 42 include respective primary and secondary coils 44, 46 of wire. The coils 44, 46 are coil windings in one example. The coils 44, 46 extend circumferentially about the central axis A in this example, and the primary coil 44 radially surrounds the secondary coil 46. The coils 44, 46 are arranged inside respective casings in one example such that the coils 44, 46 do not directly contact one another.

The primary coil 44 is electronically connected to a primary power supply 48, and the secondary coil 46 is electronically connected to a secondary power supply 50. The primary and secondary power supplies 48, 50 may be power control circuits controlled by the controller 28, and each of the power control circuits may receive power from a remote power source (e.g., utility company, on-site generator, etc.). In response to commands from the controller 28, current $I_1$, $I_2$ flows from the respective primary or secondary power supply 48, 50 through the respective primary or secondary coil 44, 46 to produce a magnetic field attracting the plate 36 in a second direction $D_2$ opposite the first direction $D_1$. The plate 36 is made at least partially of a material that is attracted to the magnetic fields, such as metal.

The magnetic field produced by the primary coil 44 is sufficient to overcome the bias force of the springs 38 and causes the plate 36 to move in the second direction $D_2$ such that the plate 36 no longer directly contacts the disc 32. In this condition, the electromagnetic brake 22 is disengaged or released, and as such, the disc 32 is free to rotate about the central axis A. The drive shaft 20 is in turn also free to rotate about the central axis A.

On the other hand, in this disclosure, the magnetic field produced by the secondary coil 46 is not sufficient to overcome the bias force of the springs 38. As such, when the secondary electromagnet 42 is activated and the primary electromagnet 40 is not activated, the plate 36 is attracted in the direction $D_2$ but the plate 36 is still in direct contact with the disc 32 such that the electromagnetic brake 22 is still engaged and braking still occurs. However, the magnetic field produced by the secondary electromagnet 42 partially offsets the bias force of the springs 38 such that a net force on the disc 32 is lessened relative to when the secondary electromagnet 42 is not activated. Activation of the secondary electromagnet 42 alone does not result in movement of the disc 32 in the direction $D_2$.

In a particular example, activating the secondary electromagnet offsets between 20-30% of the bias force of the springs 38. The actual offset may be based on the duty of the elevator car 14 and/or deceleration of the elevator car 14, as examples, and may be between 0-30% or even higher than 30% in some examples.

Among other things, activating the secondary electromagnet 42 avoids hard braking conditions which may result in reduced ride quality. Specifically, under certain conditions, braking solely by applying the bias force of the springs 38 to the plate 36 may cause the elevator car 14 to decelerate at a rate which is relatively high and uncomfortable for some passengers. Thus, in this disclosure, the secondary electromagnet 42 is activated to partially offset the bias force of the springs 38, which slows the deceleration rate of the elevator car 14 while still providing effective braking.

In a particular aspect of this disclosure, a level of current $I_1$ flowing through the primary coil 44 is fixed, and a level of current $I_2$ flowing through the secondary coil 46 is adjustable. In particular, to disengage the electromagnetic brake 22 and permit movement of the elevator car 14, the controller 28 commands the primary power supply 48 such that a level of current $I_1$ flows through the primary coil 44 to produce a magnetic field sufficient to move the plate 36 in the direction $D_2$ and out of engagement with the disc 32.

During an example braking operation, the controller 28 commands the primary power supply 48 to discontinue the flow of current $I_1$ through the primary coil 44 and further commands the secondary power supply 50 such that a level of current $I_2$ flows through the secondary coil 46. In one example, the level of current $I_2$ is such that the magnetic field produced by the secondary electromagnet 42 is within 20-30% of the strength of the magnetic field produced by the primary electromagnet 40. Accordingly, when the secondary electromagnet 42 is activated and the primary electromagnet 40 is not, the disc 32 is in direct contact with the plate 36, but the bias force of the springs 38 is partially offset by the magnetic field produced by the secondary electromagnet 42.

In a further aspect of this disclosure, the controller 28 is configured to command the secondary power supply 50 such that the level of current $I_2$ is based on one or more factors. In one example, the controller 28 commands an adjustment to the level of current $I_2$ based on a weight within an elevator car 14. The weight of the load within the elevator car 14 may be determined using known techniques, such as one or more sensors, and reported to the controller 28. In a particular example, when there are relatively few passengers within the elevator car 14, the elevator car 14 will have a relatively decreased weight, and the level current $I_2$ may be increased such that the magnetic field produced by the secondary electromagnet 42 offsets the bias force of the springs 38 to avoid hard braking sensations for the passengers.

In another example, the controller 28 commands an adjustment to the level of current $I_2$ based on a deceleration rate of the elevator car 14. The deceleration rate of the elevator car 14 may be determined using known techniques, such as being reported to the controller 28 via one or more known types of sensors, such as encoders. The controller 28 may increase the level of current $I_2$ if the deceleration rate exceeds a predetermined threshold, in one example. Alternatively or in addition, the controller 28 may use an algorithm or lookup table to set a particular level of current $I_2$ based on a specific deceleration rate. While weight and deceleration rate are mentioned herein, the controller 28 may command the secondary power supply 50 to adjust the level of current $I_2$ based on other factors.

In one aspect of this disclosure, the secondary electromagnet 42 is activated during all braking operations. In other words, whenever the primary electromagnet 40 is deactivated, the secondary electromagnet 42 is activated. In another example, the secondary electromagnet 42 is only activated during certain braking operations. For instance, the controller 28 may be configured such the secondary electromagnet 42 is only activated in response to the presence of one or more conditions. Example conditions include when the weight of the elevator car 14 exceeds a threshold, the deceleration rate of the elevator car 14 exceeds a threshold, or when slippage of one or more the suspension members 26 is identified. Slippage may be caused, for example, by unequal tensions in suspension members 26, excessive lubrication, etc. The example conditions may also include unexpected operating conditions such as emergency conditions where the passengers in the elevator car 14 may have otherwise experienced a relatively high deceleration rate.

It should be understood that terms such as "generally," "substantially," and "about" are not intended to be boundaryless terms, and should be interpreted consistent with the way one skilled in the art would interpret those terms. Further, directional terms such as "radial," "axial," and "circumferential" are used herein for purposes of explanation with reference to the normal operational orientation of an electromagnetic brake.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A passenger conveyer system, comprising:

a controller;

an electromagnetic brake, the electromagnetic brake comprising:

a disc configured to interface with a drive shaft;

a spring;

a plate biased in a first direction into engagement with the disc by a bias force of the spring;

an electromagnet selectively activated in response to a command from the controller to produce a magnetic field attracting the plate in a second direction opposite the first direction to partially offset the bias force of the spring, such that when the electromagnet is activated the plate engages the disc.

2. The passenger conveyer system as recited in claim 1, wherein the electromagnet is a secondary electromagnet, and wherein the electromagnetic brake further comprises:

a primary electromagnet selectively activated in response to a command from the controller to produce a magnetic field attracting the plate in the second direction and sufficient to overcome the bias force of the spring, such that when the primary electromagnet is activated the plate moves in the second direction and out of engagement with the disc.

3. The passenger conveyer system as recited in claim 2, wherein the primary and secondary electromagnets include a respective primary coil and a secondary coil.

4. The passenger conveyer system as recited in claim 3, wherein the primary and secondary coils are arranged circumferentially about a central axis of the electromagnetic brake, and the primary coil radially surrounds the secondary coil.

5. The passenger conveyer system as recited in claim 3, wherein:

the primary electromagnet includes a primary power supply electronically connected to the primary coil, and the secondary electromagnet includes a secondary power supply electronically connected to the secondary coil.

6. The passenger conveyer system as recited in claim 5, wherein a level of current flowing through the secondary coil is adjustable.

7. The passenger conveyer system as recited in claim 6, wherein the controller issues a command to the secondary power supply to adjust the level of current flowing through the secondary coil based on a weight within an elevator car.

8. The passenger conveyer system as recited in claim 6, wherein the controller issues a command to the secondary power supply to adjust the level of current flowing through the secondary coil based on a deceleration rate of an elevator car.

9. The passenger conveyer system as recited in claim 5, wherein the level of current flowing through the secondary coil produces a magnetic field that offsets between 20-30% of the bias force of the spring on the plate.

10. The passenger conveyer system as recited in claim 1, wherein activation of the electromagnet alone does not result in movement of the plate in the second direction.

11. The passenger conveyer system as recited in claim 1, further comprising:

an electric motor;

a drive shaft mechanically connected to the electric motor; and an elevator car suspended from at least one suspension member wrapped around the drive shaft.

12. The passenger conveyer system as recited in claim 11, wherein the electromagnet is activated when slippage of the at least one suspension member is detected.

13. The passenger conveyer system as recited in claim 1, wherein the plate includes a brake pad configured to directly contact the disc.

14. The passenger conveyer system as recited in claim 1, wherein the passenger conveyer system is an elevator system.

15. A method, comprising:

slowing a deceleration rate of an elevator car when an electromagnetic brake is engaged by activating an electromagnet to partially offset a bias force of a spring, wherein the slowing step includes adjusting a level of current flowing through a coil of the electromagnet based on either (i) the deceleration rate of the elevator car or (ii) a weight of a load within the elevator car.

16. The method as recited in claim 15, wherein:

the spring is configured to urge a plate into engagement with a disc, and the disc is interfaced with a drive shaft, the elevator car is suspended from at least one suspension member wrapped around the drive shaft.

17. A method, comprising:

slowing a deceleration rate of an elevator car when an electromagnetic brake is engaged by activating an electromagnet to partially offset a bias force of a spring, wherein the spring is configured to urge a plate into engagement with a disc, wherein the disc is interfaced with a drive shaft, wherein the elevator car is suspended from at least one suspension member wrapped around the drive shaft, and wherein the slowing step occurs in response to slippage of the at least one suspension member.

18. The method as recited in claim 15, wherein the slowing step includes adjusting the level of current flowing through the coil based on the deceleration rate of the elevator car.

19. The method as recited in claim 15, wherein the slowing step includes adjusting the level of current flowing through the coil based on a weight of a load within the elevator car.

20. The passenger conveyer system as recited in claim 1, wherein, when the electromagnet is activated, the magnetic field attracts the plate in the second direction to at most partially offset the bias force of the spring.

* * * * *